United States Patent
Li

(10) Patent No.: US 8,462,855 B2
(45) Date of Patent: Jun. 11, 2013

(54) METHOD AND APPARATUS FOR STREAM PARSING AND PICTURE LOCATION

(75) Inventor: Philip Li, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1195 days.

(21) Appl. No.: 11/904,158

(22) Filed: Sep. 26, 2007

(65) Prior Publication Data

US 2009/0080511 A1    Mar. 26, 2009

(51) Int. Cl.
*H04N 21/4331* (2006.01)
(52) U.S. Cl.
USPC ..................................... 375/240.28
(58) Field of Classification Search
CPC ............... H04N 21/4331; H04N 21/44004
USPC ..................................... 375/240.27
See application file for complete search history.

(56) References Cited

U.S. PATENT DOCUMENTS

| | | | | |
|---|---|---|---|---|
| 5,821,886 | A | * | 10/1998 | Son ................................. 341/67 |
| 5,966,409 | A | * | 10/1999 | Maeda et al. .................. 375/295 |
| 6,154,780 | A | * | 11/2000 | Zhu ................................ 709/236 |
| 6,618,446 | B1 | * | 9/2003 | Nakao ....................... 375/240.26 |
| 7,006,576 | B1 | * | 2/2006 | Hannuksela .............. 375/240.27 |
| 7,197,188 | B2 | * | 3/2007 | Hasegawa et al. ............. 382/232 |
| 7,362,907 | B2 | * | 4/2008 | Hasegawa et al. ............. 382/232 |
| 7,751,473 | B2 | * | 7/2010 | Hannuksela .............. 375/240.01 |
| 2005/0089102 | A1 | * | 4/2005 | Alvarez Arevalo et al. ......................... 375/240.27 |
| 2007/0097978 | A1 | * | 5/2007 | Nakamura ..................... 370/392 |
| 2008/0240227 | A1 | * | 10/2008 | Wan et al. ..................... 375/240 |
| 2010/0266049 | A1 | * | 10/2010 | Hashimoto et al. ...... 375/240.25 |

\* cited by examiner

*Primary Examiner* — Ricky Ngo
*Assistant Examiner* — Ben H Liu
(74) *Attorney, Agent, or Firm* — Trop, Pruner & Hu, P.C.

(57) ABSTRACT

In one embodiment of the invention, video data is received in a buffer and parsed for a first and second start code to determine whether a complete video picture is present. After failing to identify the second start code, additional video data is added to the buffer and parsed beginning from a subsequent starting point, which is based on the first ending point.

20 Claims, 3 Drawing Sheets

METHOD AND APPARATUS FOR STREAM PARSING AND PICTURE LOCATION

BACKGROUND

In systems where digital data is encoded by an encoder, transmitted in packets of digital data, and decoded by a receiver, the encoder may receive data that includes digital samples of analog signals. Video transcoding (or decoding) can be used to transcode video streams to an appropriate video format and bit rate. A Digital Media Adaptor (DMA) may then decode the stream and render it on a television.

Before transcoding or decoding the data can begin, however, some systems may first require that a complete picture be located in a buffer. To locate and determine whether a complete picture is present in the buffer, the system may parse the stream looking specific start codes. Due to the variety of digital data formats and sizes of pictures, the system may need to scan the entire current buffer when receiving one or more packets of data. As new data is received in the buffer, the previously scanned data is often scanned a second time, along with the newly received data, while searching for the aforementioned start codes. Thus, conventional picture locating algorithms require either receiving a large amount of data to parse for a complete picture or repeated searches of the buffer whenever receiving new data. Such methodologies and devices may be inefficient and lessen the performance of the decoding/transcoding system.

BRIEF DESCRIPTION OF THE DRAWINGS

The accompanying drawings, incorporated in and constituting a part of this specification, illustrate one or more implementations consistent with the principles of the invention and, together with the description of the invention, explain such implementations. The drawings are not necessarily to scale, the emphasis instead being placed upon illustrating the principles of the invention. In the drawings.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, and techniques, such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

Figure 1:
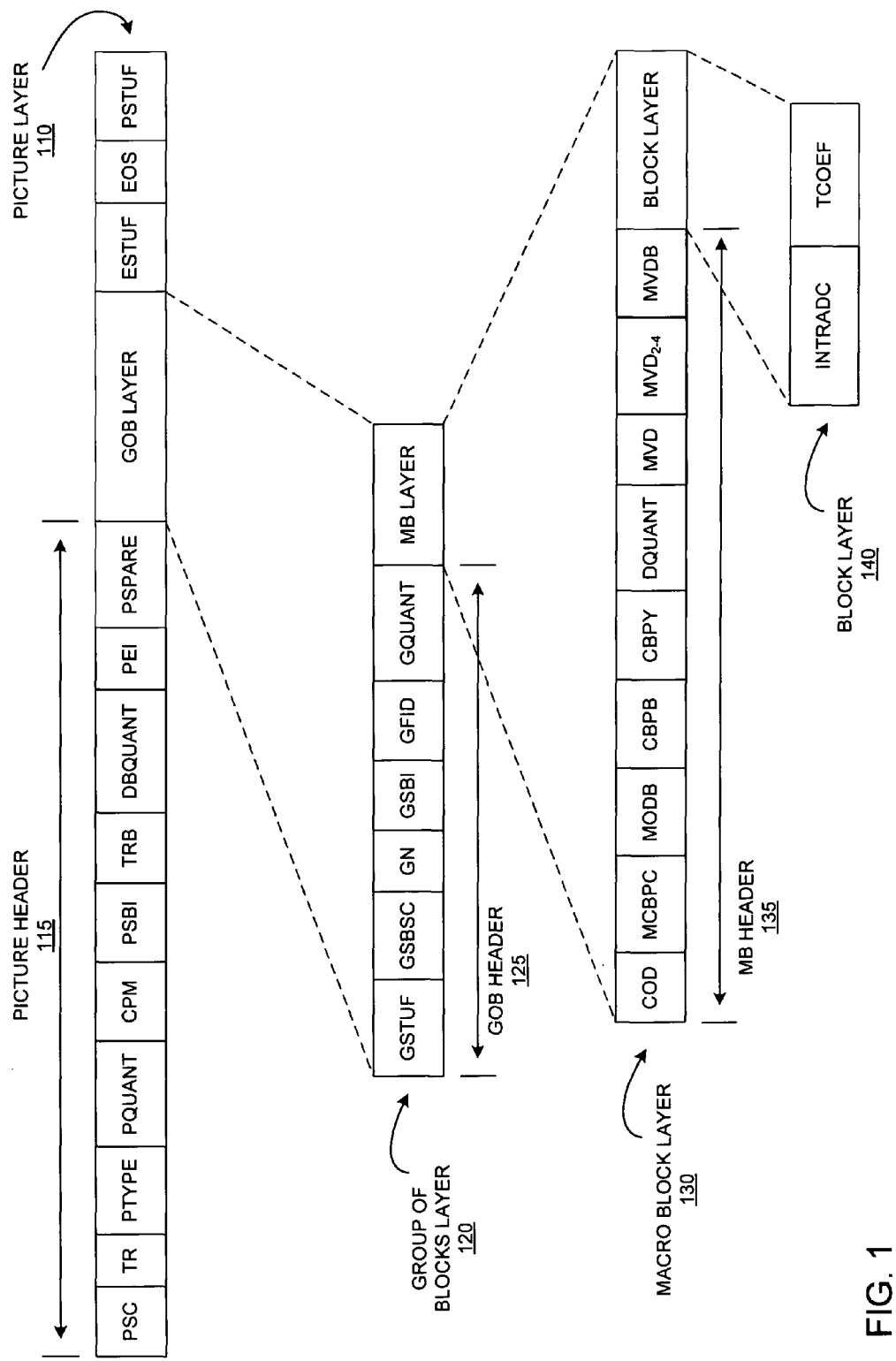
FIG. 1 is a diagram illustrating layers used to represent a picture in an encoded digital video bitstream.

FIG. 1 illustrates the layers used by H.263 to represent a picture in an encoded digital video bitstream. The Telecommunication Standardization Sector of the International Telecommunication Union (ITU-T) has specified a coded representation useful for compressing the moving picture portion of a low bitrate audio-visual service. This coded representation is described in Recommendation H.263 entitled "Video Coding For Low Bitrate Communication." Draft ITU-T Recommendation H.263, published 1995 (hereinafter H.263).

Only a brief description of the layers is presented here, as Recommendation H.263 fully describes the syntax for each layer. At the highest level, is a picture layer 110. Generally, an encoded picture includes a picture header 115, one or more Groups of Blocks in a Group of Blocks (GOB) layer, and an end of sequence (EOS) code. The picture header 115 includes, among other fields, a picture start code (PSC) field and a picture type (PTYPE) information field. These fields and their purpose are described in detail in Recommendation H.263.

The GOB layer 120 includes a GOB header 125 and a macroblock (MB) layer. The GOB header 125 includes optional stuffing bits, GSTUF, a GOB start code (GBSC), a GOB group number (GN), an optional GOB sub bitstream indicator (GSBI), a GOB frame identifier (GFID), and quantizer information (GQUANT).

The macroblock layer 130 includes a MB header 135 followed by block data in a block layer 140. At the lowest level, is the block layer 140. Each block includes an optional DC coefficient for INTRA blocks (INTRADC), and a variable length coded transform coefficient (TCOEF).

While the layers used by H.263 have been described above, the various embodiments of the invention are not limited to working with data that conforms to H.263. For example, data conforming to other members of the H.26x family of video coding standards (e.g., H.261, H.264), Moving Pictures Expert Group (MPEG) MPEG1, MPEG2, MPEG3, MPEG4 which utilize a Group of Pictures (GOP) layer, and other standards may be processed in various embodiments of the invention.

As stated above, before transcoding or decoding the data can begin, some systems may first require that a complete picture be located in a buffer. A complete picture may include or start with a PSC (e.g., 4 byte start code for MPEG2) and be followed by a second start code such as, without limitation, another PSC for a second picture, GOP start code, GBSC, EOS, and the like. A decoder may read a fixed size of data into the buffer such as, for example, packages one by one (e.g., 188 bytes per package). The system may not know whether a complete picture has been loaded. The system must parse the buffer to determine whether, for example, there are two picture start codes (e.g., the first start code to indicate a current picture and the second start code to indicate a next picture). For example, after searching "previous data", "next data" is read into the buffer and put at the end of the previous data. However, the buffer must be fully scanned from the buffer start to the buffer end to determine whether there are two picture start codes. A large portion of the "previous data" may be searched again, which is inefficient.

Figure 2:
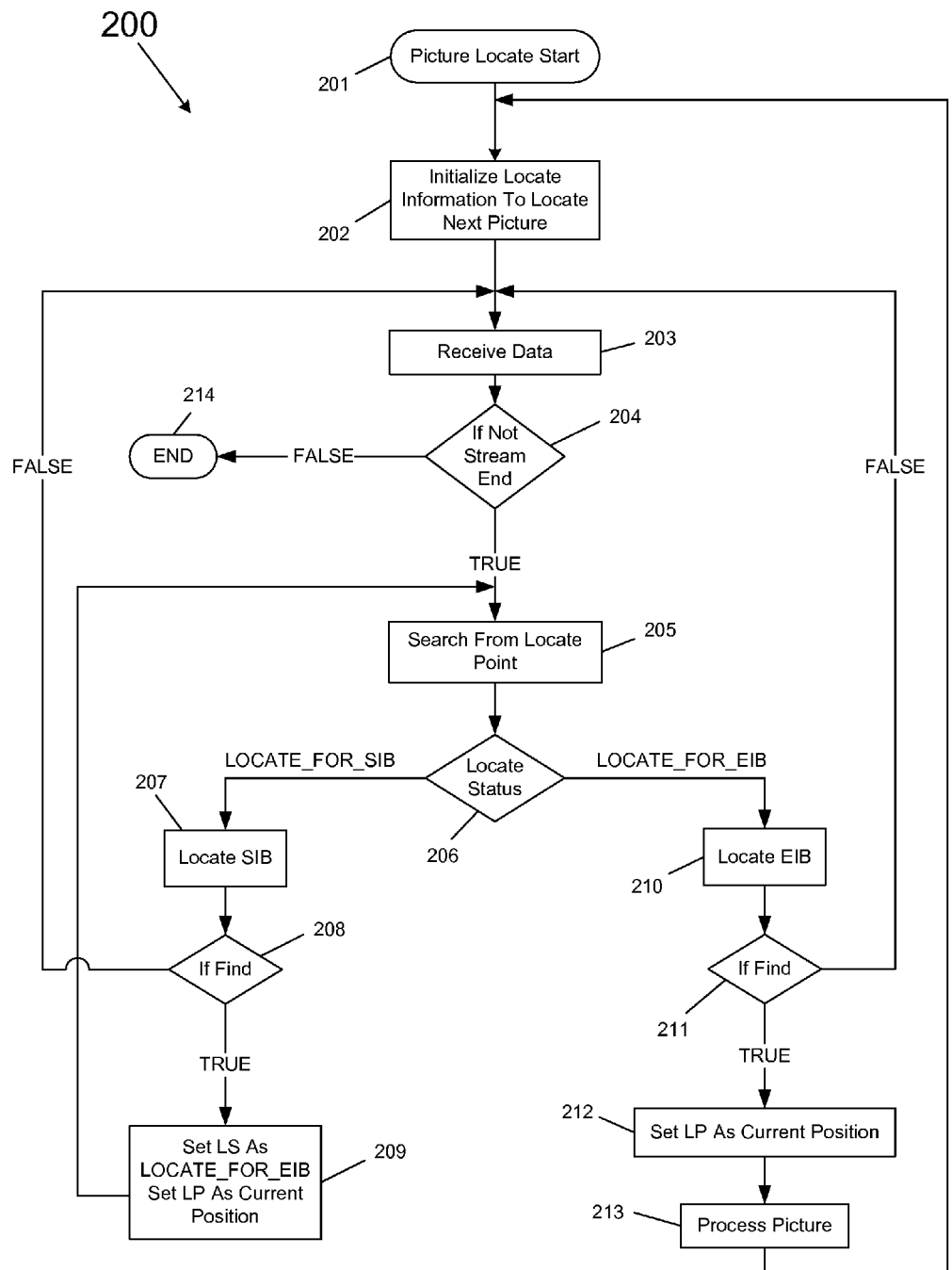
FIG. 2 is flow chart for locating a complete picture in one embodiment of the invention.

FIG. 2 is flow chart for locating a complete picture in one embodiment of the invention. In block 201, the algorithm begins. In block 202, the system initializes Locate Information, which is a structure defined as follows:

```
struct LocateInformation
{
    LOCATE_STATUS locate_status;
    BYTE_POSITION locate_point;
}
```

In one embodiment of the invention, a picture start code is initially defined as Start Indicator Bytes (SIB) and the required following start code is defined as End Indicator Bytes (EIB). The Locate Status (LS) is LOCATE_FOR_SIB and Locate Point (LP) is the buffer start. For example, the LS may indicate the first start code is to be searched for starting at the LP, or the start of the buffer in this particular instance.

In block 203, a video package or a segment of element stream data is received. In block 204, if a stream end is present, the method ends or progresses to another method. If the stream end is not present, the method progresses to block 205 where location efforts begin based on the LS and LP. In block 206, LS is determined. If LS is LOCATE_FOR_SIB, the SIB start code is searched for in block 207. If the start code is not found, more data is received in block 203. However, if the SIB start code is found, in block 209 LS is set as LOCATE_FOR_EIB and LP is set as the current position. If the location is at the buffer end, LP is set to buffer end and the system awaits more data to be entered into the buffer (not illustrated). Otherwise, the remaining data is searched for EIB as dictated in block 205 and 206 where the system confirms that LS is LOCATE_FOR_EIB. The EIB start code is searched for in block 210. If the EIB start code is not found, the method returns to block 203. If the EIB start code is found, the LP is set as the current position in block 212. At this point, a complete picture is found. The picture may be removed from the buffer for trancoding/decoding and the system may progress to block 201 to repeat the method.

In one embodiment of the invention, the system can perform instant or relatively instant picture locating based on storing previous locating information (e.g., LS, LP).

When meeting a buffer end, the method or system may will "break" and "wait" for subsequent data. When new data arrives, the locating process may continue from the previous break point based on, for example, LP. In one embodiment of the invention, the algorithm is independent of the data structure and the data size.

Based on previous locating information (e.g., LS, LP), the system need not perform any repeated search of data because, for example, in one embodiment of the invention, every search may start from a previous end position. Also, the system or method can perform instant or nearly instant picture locating no matter what the data size is and arrive time is.

Consequently, this determines whether a complete picture is present in a fast (e.g., real time) and efficient manner. Various embodiments of this invention may be used in decoders and transdecoders implemented in various arrangements such as, for example, software or hardware.

For example, if a digital video stream is input to a conventional decoder/transdecoder segment by segment, an entire picture may first be required to be received before any decoding/transdecoding may begin. However, in various embodiments of the invention once the second start code is located, a picture may be immediately or almost immediately output even though the data buffer size may be small.

As those of ordinary skill in the art will appreciate, embodiments of the invention may be implemented in a computer program. As such, these embodiments may be stored on a storage medium having stored thereon instructions which can be used to program a computer system to perform the embodiments. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs), erasable programmable read-only memories (EPROMs), electrically erasable programmable read-only memories (EEPROMs), flash memories, magnetic or optical cards, or any type of media suitable for storing electronic instructions. Similarly, embodiments may be implemented as software modules executed by a programmable control device. A programmable control device may be a computer processor or a custom designed state machine. Custom designed state machines may be embodied in a hardware device such as a printed circuit board having discrete logic, integrated circuits, or specially designed application specific integrated circuits (ASICs).

Figure 3:
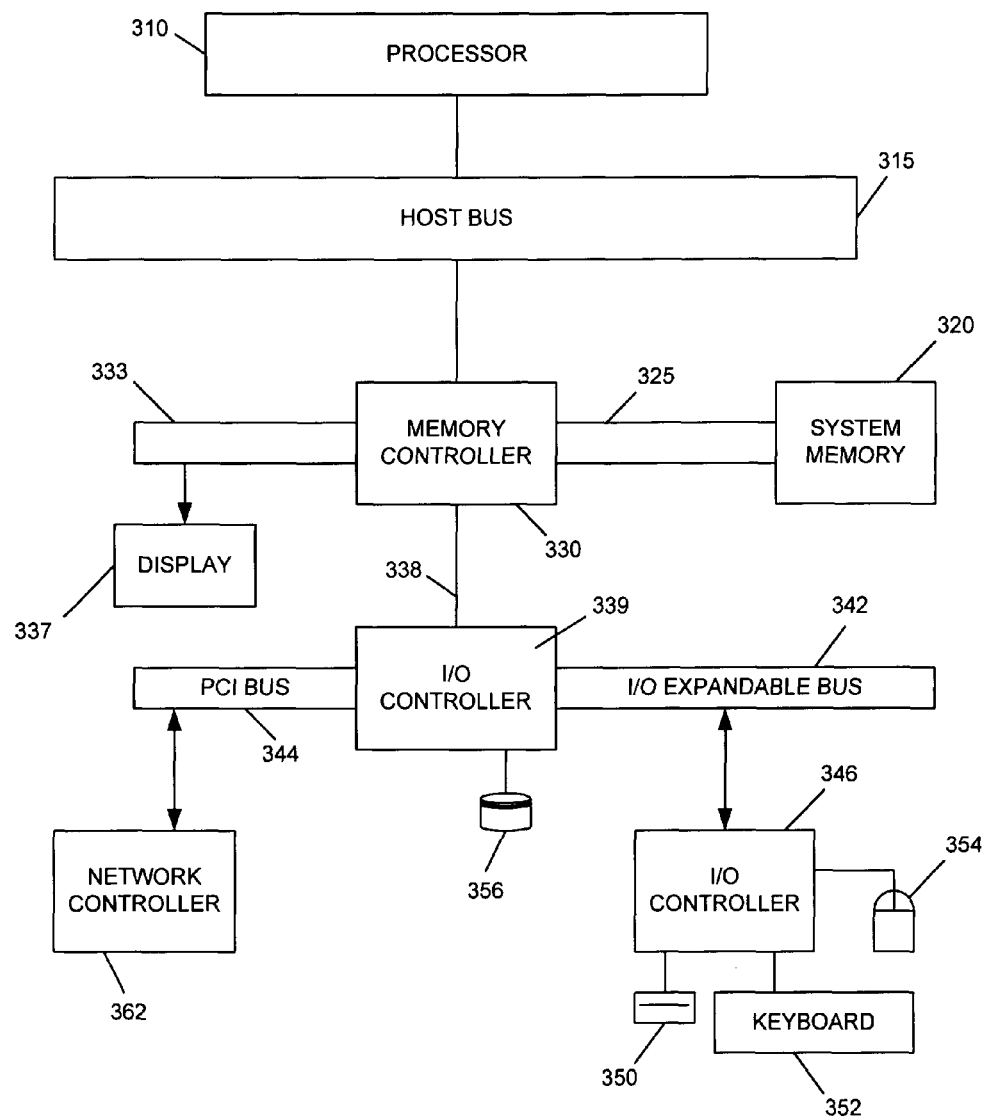
FIG. 3 is system in one embodiment of the invention.

FIG. 3 is a block diagram of a representative data processing system, namely computer system 300 with which embodiments of the invention may be used. In one embodiment, computer system 300 includes a processor 310, which may include a general-purpose or special-purpose processor such as a microprocessor, microcontroller, ASIC, a programmable gate array (PGA), and the like. The processor 310 may be coupled over a host bus 315 to a memory controller 330 in one embodiment, which may be coupled to a system memory 320 via a memory bus 325. The memory controller 330 may also be coupled over a bus 333 to a display 337.

The memory controller 330 may also be coupled (via a link 338) to an input/output (I/O) controller 339 that is coupled to an input/output (I/O) expansion bus 342. The I/O expansion bus 342 may be coupled to an I/O controller 346 that controls access to one or more I/O devices. As shown in FIG. 3, these devices may include, in one embodiment of the invention, storage devices such as a disk drive 350 and input devices, such as keyboard 352 and mouse 354. The I/O controller 339 may also be coupled to, for example, a hard disk drive or server 356. Furthermore, the I/O controller 339 may be coupled to a PCI bus 344 and a network interface card (NIC) 362. Although the description makes reference to specific components of the system 300, it is contemplated that numerous modifications and variations of the described and illustrated embodiments may be possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   setting a locate status to a first location status;
   receiving first video data in a buffer;
   parsing the first video data to identify a first start code and setting the locate status to a second locate status when the first start code is identified;
   parsing the first video data to identify a second start code to determine whether a complete video picture is present;
   discontinuing parsing the first video data at a first ending point after failing to identify the second start code;
   adding second video data to the buffer, the first video data still remaining in the buffer;
   parsing the second video data beginning from a subsequent starting point, which is based on the first ending point, and continuing until identifying the second start code when the locate status is set to the second locate status to determine that a full video picture is present in the buffer.

2. The method of claim 1, further comprising parsing the second video data beginning from the subsequent starting point, which immediately follows the first ending point and is not included in a starting code or a header.

3. The method of claim 1, further comprising parsing the second video data beginning from the subsequent starting point, which is included in a packet that does not include the first video data.

4. The method of claim 1, further comprising determining the full video picture is present in the buffer independently of the data structure of the first video data.

5. The method of claim 4, further comprising determining the full video picture is present in the buffer independently of the size of the first video data.

6. The method of claim 1, wherein identifying the second start code includes identifying a new picture start code.

7. The method of claim 1, further comprising adding the second video data immediately after the first video data, the first video data still remaining in the buffer.

8. An apparatus comprising:
a buffer to receive first video data; and
a processor, coupled to the buffer, to;
set a locate status to a first location status;
parse the first video data to identify a first start code and set the locate status to a second locate status when the first start code is identified;
parse the first video data to identify a second start code to determine whether a complete video picture is present;
discontinue parsing the first video data at a first ending point after failing to identify the second start code;
add second video data to the buffer while the first video data is still remaining in the buffer; and
parse the second video data beginning from a subsequent starting point, which is based on the first ending point, and continue until identifying the second start code when the locate status is set to the second locate status to determine that a full video picture is present in the buffer.

9. The apparatus of claim 8, wherein the processor is to parse the second video data beginning from the subsequent starting point, which immediately follows the first ending point.

10. The apparatus of claim 8, wherein the processor is to parse the second video data beginning from the subsequent starting point, which is included in packet that does not include the first video data.

11. The apparatus of claim 8, wherein the processor is to determine the full video picture is present in the buffer independently of the data structure of the first video data.

12. The apparatus of claim 11, wherein the processor is to determine the full video picture is present in the buffer independently of the size of the first video data.

13. The apparatus of claim 8, wherein the processor is to identify the second start by identifying at least one of a new picture start code, a group of pictures start code, a sequence end code, and a sequence header code.

14. The apparatus of claim 8, wherein the processor is to add the second video data immediately after the first video data, the first video data still remaining in the buffer.

15. The method of claim 1 including adding the second video data to the first video data after discontinuing parsing the first video data.

16. A machine accessible non-transitory medium having instructions stored thereon, the instructions when executed on a machine cause the machine to:
set a locate status to a first location status;
parse first video data, included in a buffer, to identify a first start code and set a the locate status to a second locate status when the first start code is identified;
parse the first video data to identify a second start code to determine whether a complete video picture is present;
discontinue parsing the first video data at a first ending point after failing to identify the second start code; and
parse second video data beginning from a subsequent starting point, which is based on the first ending point, and continue until identifying the second start code when the locate status is set to the second locate status to determine that a full video picture is present in the buffer:,
wherein the second video data is added to the buffer while the first video data is still in the buffer.

17. The medium of claim 16 storing instructions that enable the machine to parse the second video data beginning from the subsequent starting point, which immediately follows the first ending point.

18. The medium of claim 16 storing instructions that enable the machine to parse the second video data beginning from the subsequent starting point, which is included in a packet that does not include the first video data.

19. The medium of claim 16 wherein the second video data is added to the first video data after discontinuing parsing the first video data.

20. The method of claim 1, wherein the first start code and a second start code respectively include first and second picture start codes.

* * * * *